US011411829B1

(12) United States Patent
Puhan et al.

(10) Patent No.: US 11,411,829 B1
(45) Date of Patent: Aug. 9, 2022

(54) PROVISIONING MANAGED NETWORK NODES AND/OR MANAGING NETWORK NODES

(71) Applicant: Juniper Networks, Inc., Sunnyvale, CA (US)

(72) Inventors: Alfa Prakash Puhan, Bangalore (IN); Pavana Chillangi Vital Murthy, Bangalore (IN); Manish Galrani, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/583,848

(22) Filed: Sep. 26, 2019

(51) Int. Cl.
*H04L 41/12* (2022.01)
*H04L 41/28* (2022.01)
*H04L 41/082* (2022.01)
*H04L 41/0806* (2022.01)

(52) U.S. Cl.
CPC ............ *H04L 41/12* (2013.01); *H04L 41/082* (2013.01); *H04L 41/0806* (2013.01); *H04L 41/28* (2013.01)

(58) Field of Classification Search
None
See application file for complete search history.

(56) References Cited

U.S. PATENT DOCUMENTS

| 6,463,465 | B1 * | 10/2002 | Nieuwejaar | H04L 67/1002 |
| | | | | 709/212 |
| 10,560,550 | B1 * | 2/2020 | Xue | H04L 41/0846 |
| 2004/0266449 | A1 * | 12/2004 | Smetters | H04W 12/04 |
| | | | | 455/452.1 |
| 2007/0157016 | A1 * | 7/2007 | Dayan | G06F 9/4416 |
| | | | | 713/2 |
| 2008/0144590 | A1 * | 6/2008 | Rantanen | H04L 41/0806 |
| | | | | 370/338 |
| 2008/0147830 | A1 * | 6/2008 | Ridgill | H04L 67/34 |
| | | | | 709/222 |
| 2009/0019167 | A1 * | 1/2009 | Taaghol | G06F 9/4416 |
| | | | | 709/228 |

(Continued)

OTHER PUBLICATIONS

K. Watsen et at., "Secure Zero Touch Provisioning (SZTP)", Apr. 30, 2019, 87 Pages.

*Primary Examiner* — Scott B Christensen
(74) *Attorney, Agent, or Firm* — Harrity & Harrity, LLP

(57) ABSTRACT

A managing network node may provide, to a bootstrap device, a request for provisioning information to provision the managing network node and one or more managed network nodes, wherein the managing network node and the one or more managed network nodes have an existing relationship, wherein the request comprises a respective identifier for each of the managing network node and the one or more managed network nodes. The managing network node may receive, from the bootstrap device, the provisioning information, wherein the provisioning information includes first provisioning information for the managing network node and respective second provisioning information for each of the one or more managed network nodes. The managing network node may provision the managing network node using the first provisioning information and the one or more managed network nodes using the respective second provisioning information.

20 Claims, 10 Drawing Sheets

(56) References Cited

U.S. PATENT DOCUMENTS

| | | | | |
|---|---|---|---|---|
| 2011/0040933 | A1* | 2/2011 | Swindell | G06F 21/45 711/104 |
| 2012/0011230 | A1* | 1/2012 | Moreman | H04L 61/2015 709/220 |
| 2013/0077621 | A1* | 3/2013 | Jacob Da Silva | H04L 49/40 370/355 |
| 2014/0122674 | A1* | 5/2014 | Gray | H04L 61/6022 709/222 |
| 2015/0012623 | A1* | 1/2015 | Jubran | H04L 41/0856 709/220 |
| 2016/0262199 | A1* | 9/2016 | Patil | H04W 8/005 |
| 2016/0294819 | A1* | 10/2016 | Salmela | H04W 12/04031 |
| 2016/0315810 | A1* | 10/2016 | Francescangeli | H04W 48/20 |
| 2018/0270110 | A1* | 9/2018 | Chugtu | H04L 61/2015 |

\* cited by examiner

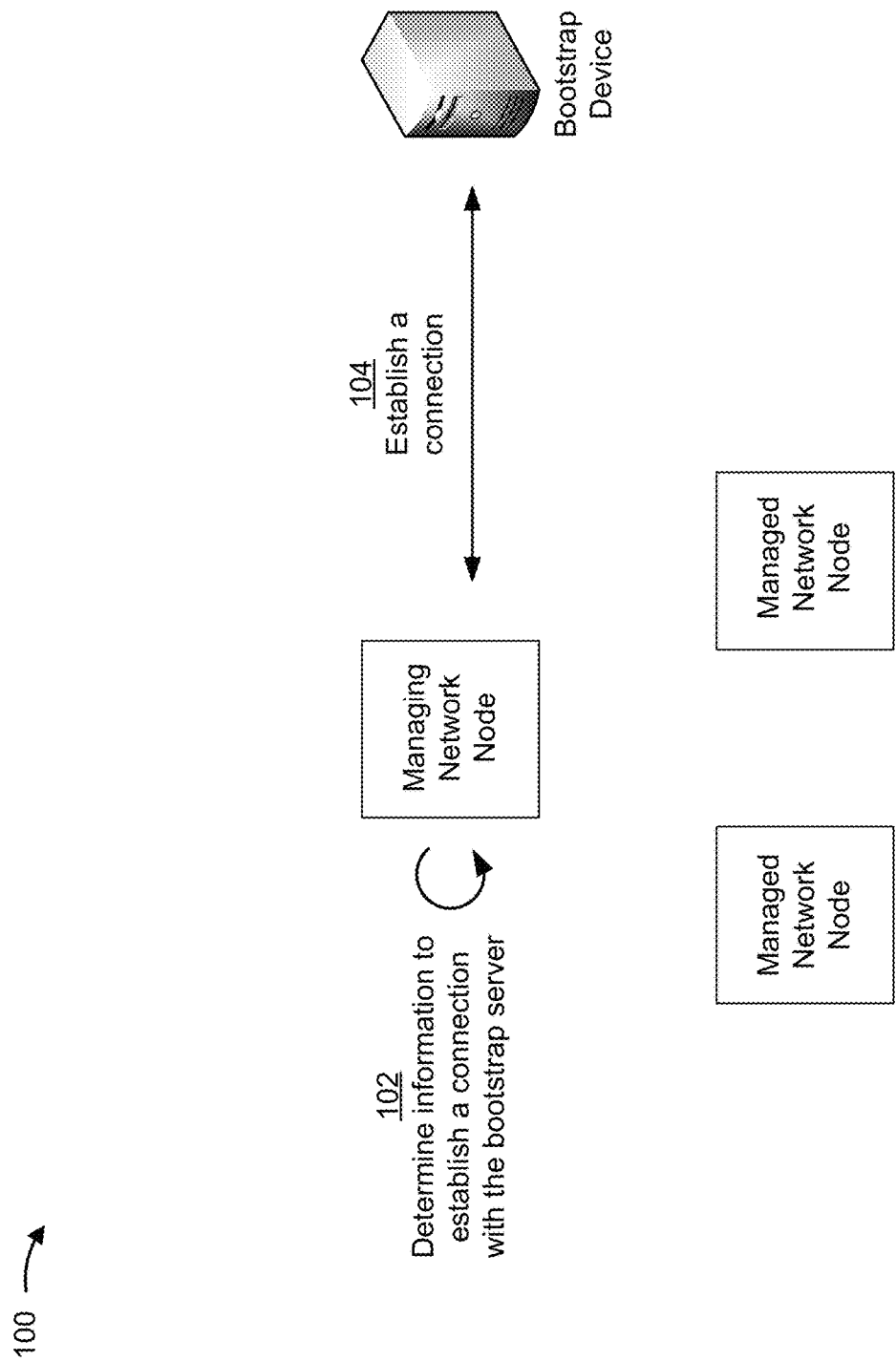

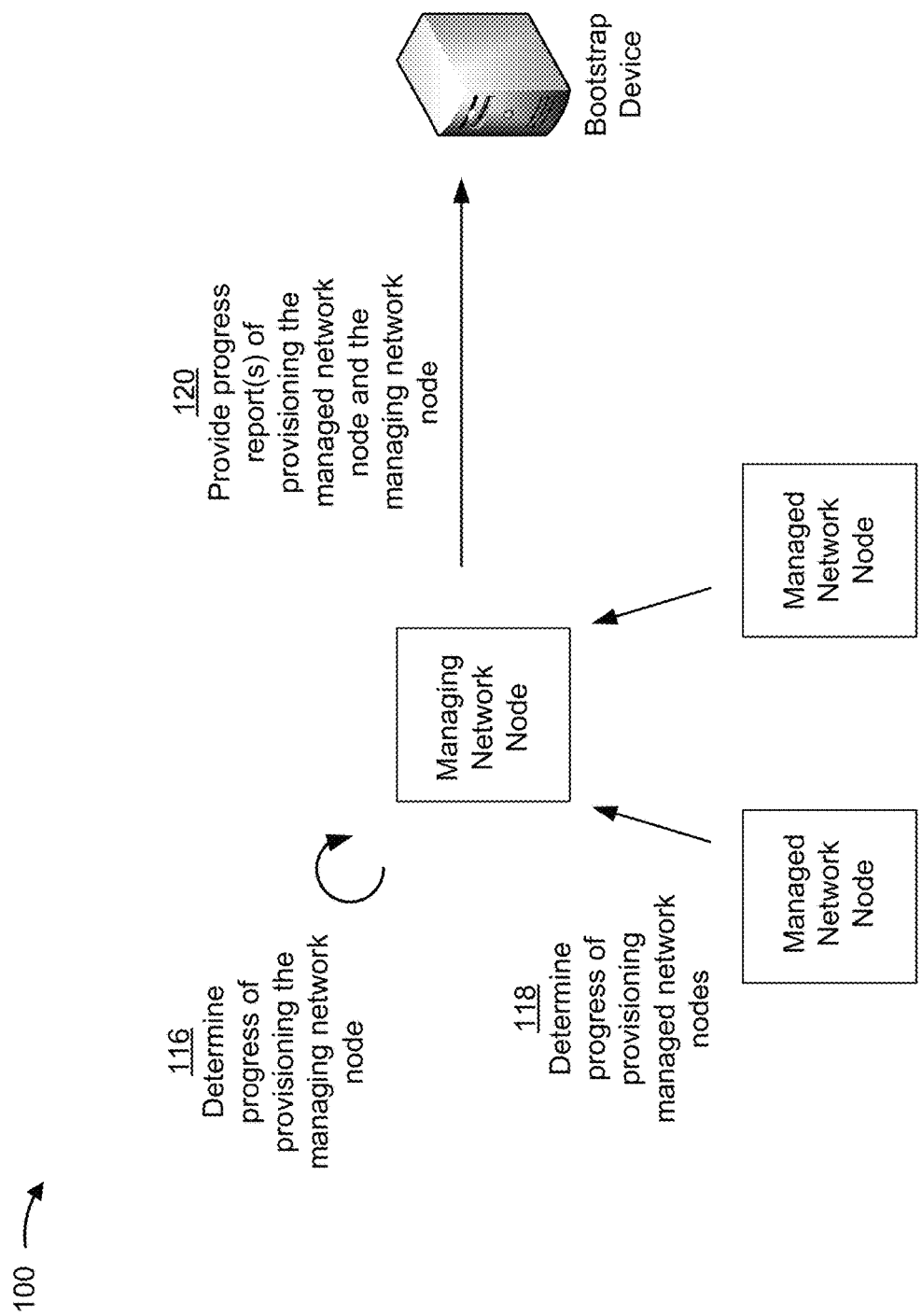

PROVISIONING MANAGED NETWORK NODES AND/OR MANAGING NETWORK NODES

BACKGROUND

Secure Zero Touch Provisioning (SZTP) is a technique to securely provision a network node when the network node is booting in a factory-default state. Provisioning may include updating the boot image, committing an initial configuration, and executing arbitrary scripts to address auxiliary needs. Once provisioned, the network node is able to establish secure connections with other network nodes.

SUMMARY

According to some implementations, a method may include providing, by a managing network node and to a bootstrap device, a request for provisioning information to provision the managing network node and one or more managed network nodes, wherein the managing network node and the one or more managed network nodes have an existing relationship, wherein the request comprises a respective identifier for each of the managing network node and the one or more managed network nodes; receiving, by the managing network node and from the bootstrap device, the provisioning information, wherein the provisioning information includes first provisioning information for the managing network node and respective second provisioning information for each of the one or more managed network nodes; and provisioning, by the managing network node, the managing network node using the first provisioning information and the one or more managed network nodes using the respective second provisioning information.

According to some implementations, a managing network node may include one or more memories; and one or more processors to: provide, to a device, a request for provisioning information to provision the managing network node and one or more managed network nodes, wherein the managing network node and the one or more managed network nodes have an existing relationship, wherein the request comprises a respective identifier for each of the managing network node and the one or more managed network nodes; receive, from the device, the provisioning information, wherein the provisioning information includes first provisioning information for the managing network node and respective second provisioning information for each of the one or more managed network nodes; provision the managing network node using the first provisioning information; and provide the respective second provisioning information to the one or more managed network nodes to enable the one or more managed network nodes to be provisioned using the respective second provisioning information.

According to some implementations, a non-transitory computer-readable medium may store one or more instructions. The one or more instructions, when executed by one or more processors of a managing network node, may cause the one or more processors to: provide, to a bootstrap device, a request for provisioning information to provision a managing network node and one or more managed network nodes, wherein the managing network node and the one or more managed network nodes have an existing relationship, wherein the request comprises a respective identifier for each of the managing network node and the one or more managed network nodes; receive, from the bootstrap device, the provisioning information, wherein the provisioning information includes first provisioning information for the managing network node and respective second provisioning information for each of the one or more managed network nodes; provision the managing network node using the first provisioning information and the one or more managed network nodes using the respective second provisioning information; and provide, to the bootstrap device, one or more progress reports indicating progress of provisioning the managing network node or a managed network node of the one or more managed network nodes.

BRIEF DESCRIPTION OF THE DRAWINGS

FIGS. 1A-1D are diagrams of one or more example implementations described herein.

DETAILED DESCRIPTION

Figure 1B:
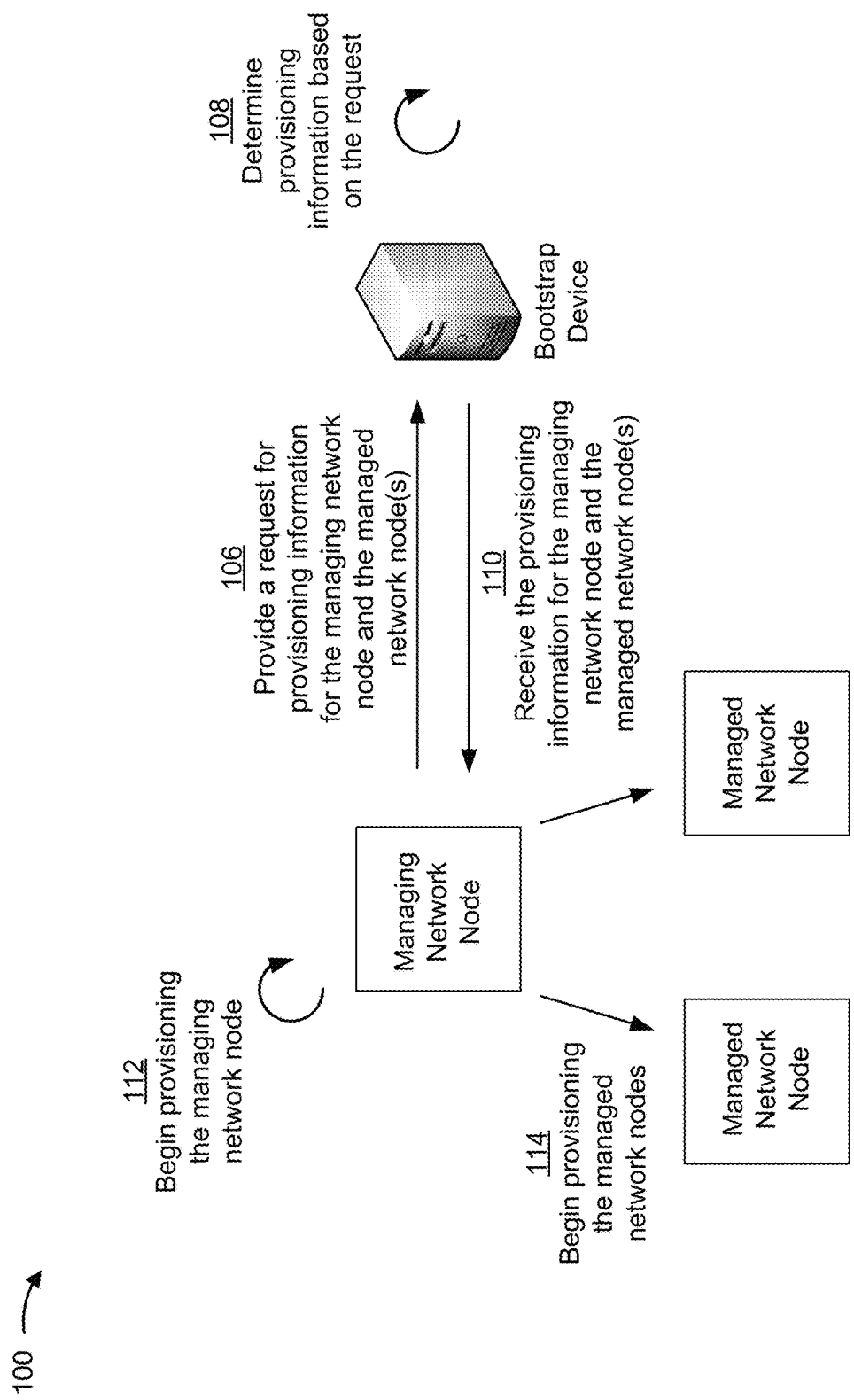

The following detailed description of example implementations refers to the accompanying drawings. The same reference numbers in different drawings may identify the same or similar elements.

Secure Zero Touch Provisioning (SZTP) may be useful for provisioning network nodes upon deployment from a factory-default state. Network operators that deploy network nodes configured for SZTP may reduce errors in the installation process by allowing the provisioning process to be automated and may reduce costs of manually provisioning the network nodes by on-site operators.

When a network node is coupled to power, the network node may communicate with a deployment-specific Dynamic Host Configuration Protocol (DHCP) server or a redirect server, which may be local to the network node or may be accessible via a relay. The network node may receive network address (e.g., an Internet Protocol (IP) address) for the network node and a network address (e.g., an IP address) for a bootstrap device storing, or having access to, provisioning information for the network node.

The network node may then request, from the bootstrap device, provisioning information (also referenced as "bootstrapping data," "bootstrap information," or "onboarding information") for provisioning the network node. The request includes an identification of the network node, which the bootstrap device can use to look up provisioning information for the network node. The bootstrap device may locate the appropriate provisioning information, based on the identification of the network node, and provide the provisioning information to the network node to enable the network node to provision itself.

The network node may provide one or more progress reports to the bootstrap device to indicate progress of the provisioning the network node. The network node may also provide a message to the bootstrap device to indicate that the provisioning has been completed.

If multiple network nodes are deployed, each network node independently performs the SZTP process to provision itself. Independently performing the SZTP process consumes network resources of one or more communication networks supporting the communications involved in the provisioning process for each of the multiple network nodes.

Additionally, independently performing the SZTP process consumes communication resources of each of the multiple network nodes to transmit and receive the communications involved in the provisioning process.

According to some implementations described herein, a managing network node performs a provisioning process in which the managing network node provisions itself and one or more managed network nodes. The managing network node may provide a request for provisioning information to provision the managing network node and the one or more managed network nodes. The request may include a respective identifier for each of the managing network node and the one or more managed network nodes.

The managing network node and the one or more managed network nodes may have an existing relationship in which the managing network node is configured to provide instructions to the one or more managed network nodes. The existing relationship may also include the managing network node being configured to interface with a bootstrap device storing, or having access to, provisioning information for the managing network node and the one or more managed network nodes.

The bootstrap device uses the identifiers included in the request to obtain provisioning information for each of the managing network node and the one or more managed network nodes. The bootstrap device provides, to the managing network node, first provisioning information for the managing network node and respective second provisioning information for each of the one or more managed network nodes. The managing network node may provision itself using the first provisioning information and may provision each of the one or more managed network nodes using the respective second provisioning information. Alternatively, the managing network node may provision itself using the first provisioning information and may provide the respective second provisioning information to the one or more managed network nodes to enable the one or more managed network nodes to provision themselves using the respective second provisioning information.

In this way, the managing network node may request and receive provisioning information for the one or more managed network nodes without the one or more managed network nodes communicating directly with the bootstrap device. In some instances, the one or more managed network nodes are unable to communicate directly with the bootstrap device because of the configuration of the one or more managed network nodes, a lack of a direct physical connectivity or access to the network, and/or the like. For example, in a virtual chassis configuration, only one member (e.g., the managing network node) may have physical connectivity to the network. Therefore, the managing network node may be enabled to perform or support SZTP of the one or more managed network nodes, to which SZTP might not otherwise be available. Additionally, the managing network node may be able to receive different provisioning information for some or all of the one or more managed network nodes by providing identifiers corresponding to each of the one or more managed network nodes, which identifiers may correlate to the different provisioning information.

The managing network node may conserve computing resources (e.g., processor resources, memory resources, communication resources, and/or the like) and network resources that may otherwise be consumed by having multiple network nodes separately and individually perform a provisioning process. In particular, the managing network node may conserve network resources of one or more communication networks that may otherwise be used to support communications involved in a separate and individual provisioning process for each of the multiple network nodes. Additionally, the managing network node may conserve communication resources that may otherwise be used by the managing network node and each of the one or more managed network nodes to transmit and receive the communications involved in the provisioning process. Further, the managing network node may expedite the provisioning process for the managing network node and the one or more managed network nodes, when compared to separately and individually performing the provisioning process for the managing network node and each of the one or more managed network nodes.

FIGS. 1A-1D are diagrams of one or more example implementations 100 described herein. As shown in FIGS. 1A-1D, the example implementation(s) 100 may include managing network node, one or more managed network nodes, a bootstrap device, and/or the like. The managing network node and the one or more managed network nodes may be switches, routers, security devices, devices implementing virtual machines, cloud computing resources, and/or the like. The managing network node and the one or more managed network nodes may be any device that can use a software image, is upgradeable, can be provisioned, and/or the like.

The managing network node and the one or more managed network nodes may have an existing relationship. In some implementations, the existing relationship may be that the managing network node is configured to manage a provisioning process for the one or more managed network nodes by communicating with external devices, such as the bootstrap device. In some implementations, the existing relationship may be that the managing network node and the one or more managed network nodes are associated with a same chassis, a same virtual chassis, a same chassis cluster, a multiple routing component system, and/or the like. In some implementations, the managing network node and the one or more managed network nodes may have another type of relationship.

When associated with the same chassis, the managing network node and the one or more managed network nodes may be configured in a hierarchical configuration, a spine and leaf configuration, and/or the like. In the hierarchical configuration, the managing network node may be on a same or different level of the hierarchy as the one or more managed network nodes. In the spine and leaf configuration, each of the managing network node and the one or more managed network nodes may be defined as a leaf node, a spine node, or a core node. In either the hierarchical configuration or the spine and leaf configuration, the managing network node and the one or more managed network nodes may communicate with each other to accomplish a task (e.g., transmit data, process data, and/or the like).

When associated with the same virtual chassis, the managing network node and the one or more managed network nodes may be physically separate devices that function as a single, logical network node of the virtual chassis. One of the physically separate devices may be the managing network node, such that the managing network node manages one or more of the other physically separate devices (managed network nodes) to function as a single, logical network node. The managing network node may provide information, such as provisioning information, commands, and/or the like to one or more of the other physically separate devices.

When associated with the same chassis cluster, a pair of physically separate network nodes may be connected together and configured to function as a single, logical network node. A network node of the pair of network nodes may be the managing network node and the other of the pair of network nodes may be the managed network node. The managing network node may provide information, such as provisioning information, commands, and/or the like to the managed network node.

When associated with the multiple routing component system, two or more network nodes on a chassis function as routing components in a same routing platform. One of the routing components functions as the managing routing component, and the other functions as a managed routing component that backs up the managing routing component in case the managing routing component fails. When a routing component is configured as the managing routing component, the routing component receives and transmits routing information, builds and maintains routing tables, communicates with interfaces and components of a packet forwarding component, and manages the chassis. When a routing component is configured to be the managed routing component, the routing component may not communicate with components of the packet forwarding component or other chassis components.

As shown in FIG. 1A, and by reference number 102, the managing network node determines information to establish a connection with the bootstrap device. In some implementations, the managing network node may boot in factory mode and request, from a deployment-specific Dynamic Host Configuration Protocol (DHCP) server, a network address (e.g., an IP address) for the managing network node and/or a network address (e.g., an IP address) of the bootstrap device, one or more other bootstrap devices, and/or the like. In some implementations, the managing network node may request, from a redirect server, the network address of the bootstrap device, one or more other bootstrap devices, and/or the like.

As shown by reference number 104, the managing network node and the bootstrap device establish a connection. In some implementations, the managing network node may use the network address of the bootstrap device to request and/or establish the connection.

As shown in FIG. 1B, and by reference number 106, the managing network node may provide, to the bootstrap device, a request for provisioning information to provision the managing network node and the one or more managed network nodes. The request may comprise a respective identifier (e.g., a unique identifier) for each of the managing network node and the one or more managed network nodes. In some implementations, the managing network node may obtain, from the one or more managed network nodes, the respective identifiers before providing the request for the provisioning information. In some implementations, the managing network node may be preconfigured with the respective identifiers for each of the managed network nodes. The identifiers in the request may enable the bootstrap device to identify first provisioning information for the managing network node and respective second provisioning information for each of the one or more managed network nodes.

The managing network node may provide the request via a single message to the bootstrap device. The single message may include respective fields for an identifier of the managing network node, an identifier of an operating system of the managing network node, an identifier of an operating system version of the operating system of the managing network node, an identifier of a hardware model of the managing network node, information related to the one or more managed network nodes, and/or the like. The field for information related to the one or more managed network nodes may include a subfield for each of the one or more managed network nodes, each of which may include further subfields for an identifier for a respective managed network node, an identifier of an operating system of the respective managed network node, an identifier of an operating system version of the operating system of the respective managed network node, an identifier of a hardware model of the respective managed network node, and/or the like.

In this way, the managing network node may request provisioning information for itself along with the one or more managed network nodes, which one or more managed network nodes might not otherwise be able to request the provisioning information from the bootstrap device because of the configuration as managed network nodes. Additionally, the managing network node sending the request in a single message to the bootstrap device may conserve computing resources that may otherwise be used to send individual messages for each of the network nodes (including the managing network node and the one or more managed network nodes). Further, the managing network node sending the request in a single message to the bootstrap device may conserve network resources of one or more communication networks that may otherwise be used to support requests from each of the one or more managed network nodes.

As shown by reference number 108, the bootstrap device may determine provisioning information based on the request. In some implementations, the bootstrap device may use the identifiers for each of the network nodes to identify corresponding provisioning information stored in a storage component. The bootstrap device may identify first provisioning information for the managing network node and respective second provisioning information for each of the one or more managed network nodes.

In some implementations, the storage component storing the corresponding provisioning information may be local to the bootstrap device. Alternatively, the storage component storing the corresponding provisioning information may be located in another device, such as an orchestrator network management system and/or the like. If the storage component storing the corresponding provisioning information is located in another device, the bootstrap device may provide a request to the other device, which request may seek provisioning information and/or provide the identifiers for each of the network nodes.

As shown by reference number 110, the managing network node may receive the provisioning information from the boot strap device. The received provisioning information may include first provisioning information for the managing network node and respective second provisioning information for each of the one or more managed network nodes.

In some implementations, the managing network node may receive the provisioning information via a single message from the bootstrap device. The single message may include respective fields for an identifier for the managing network node, an indication of a boot image for the managing network node, a download uniform resource identifier (URI) for the managing network node, an image verification identifier for the managing network node, information related to the one or more managed network nodes, information related to configuration handling for the managing network node, a pre-configuration script for the managing network node, information related to a configuration of the managing network node, a post-configuration script for the managing network node, and/or the like.

The field for the identifier may include information that uniquely identifies the managing network node. The field for indication of the boot image may specify criteria for a boot image that the managing network node will use to operate and/or information enabling the managing network node to install the boot image. The field for the download URI may include a list of one or more URIs from which the boot image may be obtained by the managing network node. The field for the image verification identifier may include a description of required contents of the boot image, such that the managing network node may verify that the managing network node has received the boot image in entirety and that the boot image is not corrupted. The field for the configuration handling may describe how a configuration for the managing network node should be processed (e.g., merging a configuration into a running data store, replacing the running data store with the configuration, and/or the like). The field for the pre-configuration script may include a script that, when present, is executed before the configuration is processed (e.g., to identify information to be used for the configuration, to identify any errors from executing the script, to back up information, and/or the like). The field for information related to the configuration of the managing network node may specify an initial configuration for the managing network node. The field for the post-configuration script may include a script for the managing network node to execute after performing the initial configuration (to identify information, to identify errors with the initial configuration, and/or the like).

The field for information related to the one or more managed network nodes may also include a subfield for provisioning information for each of the one or more managed network nodes, each of which may include an identifier of a respective managed network node, an indication of a boot image for the respective managed network node, a download uniform resource identifier (URI) for the respective managed network node, an image verification for the respective managed network node, information related to configuration handling for the respective managed network node, a pre-configuration script for the respective managed network node, information related to a configuration for the respective managed network node, a post-configuration script for the respective managed network node, and/or the like. The fields for information related to the one or more managed network nodes may include information for the one or more managed network nodes, which information is similar to that of the information for the managing network node in corresponding fields described above.

The provisioning information may comprise information to enable the managing network node and the one or more managed network nodes to update a boot image for the managing network node and the one or more managed network nodes, perform an initial configuration for the managing network node and/or the one or more managed network nodes, establish one or more connections with one or more additional devices (e.g., after performing at least a portion of the provisioning such as executing the pre-configuration script, committing the initial configuration, executing the post-configuration script, and/or the like), and/or the like.

In this way, the managing network node may receive provisioning information for itself and the one or more managed network nodes, which one or more managed network nodes might not otherwise be able to directly receive the provisioning information from the bootstrap device because of the configuration as managed network nodes. Additionally, the managing network node receiving the provisioning information in a single message from the bootstrap device may conserve computing resources that may otherwise be used to receive individual messages for each of the network nodes. Further, the managing network node receiving the provisioning information in a single message from the bootstrap device may conserve network resources of one or more communication networks that may otherwise be used to support transmissions of provisioning information to each of the one or more managed network nodes.

As shown by reference number 112, the managing network node may begin provisioning itself using the provisioning information (e.g., the first provisioning information). In some implementations, the provisioning process includes several steps, which may be performed in a predefined order.

In some implementations, the managing network node may parse the provisioning information to extract values of the fields described above. If the boot image criteria are specified, the managing network node may determine if the boot image that the managing network node is currently using satisfies the specified boot image criteria. If the managing network node is not using a boot image that satisfies the specified boot image criteria, the managing network node may download (from a source identified in the field for the download URI), verify, and/or install the boot image that satisfies the specified boot image criteria. To verify the boot image, the managing network node may use a verification fingerprint supplied in the provisioning information, a cryptographic signature within the boot image, and/or the like. After installing the boot image, the managing network node may reboot. If the installation of the boot image is successful, the managing network node may determine that the managing network node is currently using a boot image that satisfies the specified boot image criteria and may proceed with the provisioning process. If unsuccessful, the managing network node may repeat the previous steps including downloading, verifying, and installing the boot image.

If the provisioning information includes a pre-configuration script, the managing network node may execute the pre-configuration script, capture any output emitted from the pre-configuration script, and detect any warnings or errors from executing the pre-configuration script. If the provisioning information specifies an initial configuration, the managing network node may commit the initial configuration using instructions provided in the field for information related to configuration handling for the managing network node. If the provisioning information includes a post-configuration script, the managing network node may execute the post-configuration script, capture any output emitted from the post-configuration script, and detect any warnings or errors from executing the post-configuration script.

If the managing network node identifies an error at a step of the provisioning process, the managing network node may provide a notification of the error to the bootstrap device and/or restart the provisioning process. If restarting the provisioning process, some information and/or configurations may be retained from the bootstrapping process (e.g., updated boot image, logs, remnants from a script, etc.). However, the retained information and/or configurations may not be active (e.g., no new configuration or running of software) to avoid impairing the ability for the managing network node to continue the bootstrapping process (e.g., process provisioning information from another bootstrap device).

As shown by reference number 114, the managing network node may begin provisioning the one or more managed network nodes. In some implementations, the managing network node performs the provisioning for the one or more managed network nodes using the provisioning information (e.g., the second provisioning information). In some implementations, the managing network node provides the provisioning information (e.g., the respective second provisioning information) to the one or more managed network nodes to enable the one or more managed network nodes to be provisioned using the provisioning information (e.g., by the respective managed network nodes or another device).

In some implementations, the managing network node may begin provisioning the one or more managed network nodes after the managing network node has completed provisioning the managing network node. In some implementations, the managing network node may begin provisioning the one or more managed network nodes after the managing network node has successfully installed the boot image for the managing network node and before the managing network node executes the pre-configuration script, commits the initial configuration, executes the post-configuration script, and/or the like for the managing network node.

If the managing network node performs the provisioning for a respective one of the one or more managed network nodes, the managing network node may perform the provisioning in a manner similar to the provisioning process of the managing network node described above. If the managing network node instead provides the provisioning information to the one or more managed network nodes, a similar process may be used by a respective one of the one or more managed network nodes or another device performing the provisioning process for the one or more managed network nodes.

In the context of an example where the managing network node performs the provisioning for a respective one of the one or more managed network nodes, the managing network node may parse the provisioning information to extract values of the subfields within the subfield for information related to the respective one of the one or more managed network nodes, as described above. If boot image criteria are specified within the subfields, the managing network node may determine if a boot image that the respective managed network node is currently using satisfies the specified boot image criteria. If the respective managed network node is not using a boot image that satisfies the specified boot image criteria, the managing network node may download (from a source identified in the field for the download URI), verify, and/or install (on the respective managed network node) the boot image that satisfies the specified boot image criteria. To verify the boot image, the managing network node may use a verification fingerprint supplied in the provisioning information, a cryptographic signature within the boot image, and/or the like. After installing the boot image on the respective managed network node, the managing network node may cause the respective managed network node to reboot. If the installation of the boot image is successful, the managing network node may determine that the respective managed network node is currently using a boot image that satisfies the specified boot image criteria. If unsuccessful, the managing network node may repeat the previous steps including downloading, verifying, and installing the boot image for the respective managed network node.

If the provisioning information for the respective managed network node includes a pre-configuration script, the managing network node may cause the respective managed network node to execute the pre-configuration script, capture any output emitted from the pre-configuration script, and detect any warnings or errors from executing the pre-configuration script. If the provisioning information specifies an initial configuration, the managing network node may commit the initial configuration for the respective managed network node using instructions provided in the subfield for information related to configuration handling for the respective managed network node. If the provisioning information for the respective managed network node includes a post-configuration script, the managing network node may execute the post-configuration script, capture any output emitted from the post-configuration script, and detect any warnings or errors from executing the post-configuration script.

If the managing network node identifies an error at a step of the provisioning process for the respective managed network node, the managing network node may provide a notification of the error to the bootstrap device and/or restart the provisioning process for the respective managed network node. If restarting the provisioning process for the respective managed network node, some information and/or configurations may be retained from the bootstrapping process (e.g., updated boot image, logs, remnants from a script, etc.). However, the retained information and/or configurations may not be active (e.g., no new configuration or running of software) to avoid impairing the ability for the managing network node to continue the bootstrapping process for the respective managed network node (i.e., processing provisioning information from another bootstrap device).

In some implementations, first and second managed network nodes, of the one or more managed network nodes, are provisioned using the same provisioning information. In other words, the second provisioning information used to provision the first managed network node is the same as the second provisioning information used to provision the second managed network node. In some implementations, first and second managed network nodes, of the one or more managed network nodes, are provisioned using different provisioning information. In other words, the second provisioning information used to provision the first managed network node is different from the second provisioning information used to provision the second managed network node.

As shown in FIG. 1C, and by reference number 116, the managing network node may determine progress of provisioning the managing network node. In some implementations, the managing network node identifies a plurality of steps that indicate the progress of provisioning the managing network node. The managing network node may determine progress of provisioning the managing network node based on whether a step has been successfully completed, if an error was detected while attempting to perform the step, and/or the like.

As shown by reference number 118 the managing network node may determine progress of provisioning the one or more managed network nodes. In some implementations, the managing network node identifies the progress of provisioning the one or more managed network nodes according to completion of one or more steps including, for example, executing a pre-configuration script, initiating bootstrapping, downloading the boot image, completing bootstrapping, committing the initial configuration, executing a post-configuration script, and/or the like.

In some implementations, the managing network node determines the progress of provisioning the one or more managed network nodes based on the managing network node determining progress as the managing network node performs one or more steps included in the provisioning process for the one or more managed network nodes and tracks the steps as having been completed, having failed based on errors, and/or the like. In some implementations, the managing network node determines the progress of provisioning the one or more managed network nodes by receiving, from the one or more managed network nodes, one or more indications of the progress. For example, if the managing network node provided the respective second provisioning information to the one or more managed network nodes, rather than the managing network node performing the provisioning using the second provisioning data, the managing network node may be unaware of the progress until the managing network node receives an indication of the progress from the one or more managed network nodes.

In some implementations, the managing network node requests the indication of the progress of provisioning the one or more managed network nodes from the one or more managed network nodes, which return an indication of the progress of provisioning. In some implementations, the one or more managed network nodes provide the indication of the progress of provisioning of the one or more managed network nodes without receiving a request for the indication from the managing network node. For example, the one or more managed network nodes may provide the indication upon completion of one or more steps of the provisioning process, after a time period, and/or the like.

As shown by reference number 120, the managing network node may provide, to the bootstrap device, one or more progress reports indicating progress of provisioning the managing network node or a managed network node of the one or more managed network nodes. For example, one or more progress reports may indicate initiation of a step of the provisioning process, successful completion of a step of the provisioning process, an error identified while attempting to perform a step of the provisioning process, and/or the like.

The managing network node may provide a progress report, to the trusted bootstrap device, indicating that provisioning (also referenced as "bootstrapping") has been initiated. If the managing network node detects an error while parsing the provisioning information to extract values of the fields described above, the managing network node may provide a progress report indicating the parsing error. The managing network node may provide a progress report indicating that the boot image currently used by the managing network node does not match the boot image specified in the provisioning information. If an error occurs during the downloading, verifying, and/or installing of the boot image, the managing network node may provide a progress report indicating a boot image error. After successfully installing the boot image that satisfies the specified boot image criteria, the managing network node may provide a progress report indicating that the boot image is installed and the managing network node will begin a reboot.

If the managing network node detects an error from executing the pre-configuration script, the managing network node may provide a progress report indicating the pre-configuration script error. If the managing network node detects an error from committing the initial configuration, the managing network node may provide a progress report indicating the configuration error. If the managing network node detects an error from executing the post-configuration script, the managing network node may provide a progress report indicating the post-configuration script error.

In some implementations, the managing network node may provide a progress report after determining that a step of provisioning the managing network is complete and/or determining that a step of provisioning one of the one or more managed network nodes is complete. In some implementations, the managing network node may provide a plurality of progress reports with each progress report indicating progress of provisioning only one of the managing network node or the one or more managed network nodes. In some implementations, the managing network node may provide one or more progress reports that may indicate progress of provisioning more than one of the managing network node or the one or more managed network nodes. For example, the managing network node may periodically provide a progress report with all updates to progress of provisioning the managing network node and the one or more managed network nodes, with the period based on a time interval, a minimum number of completed steps to report, and/or the like. In some implementations, the managing network node may provide a progress report with updates of provisioning a plurality of similar managed nodes (e.g., managed nodes having a same hardware model, having the same or substantially the same provisioning information, and/or the like).

Figure 1D:
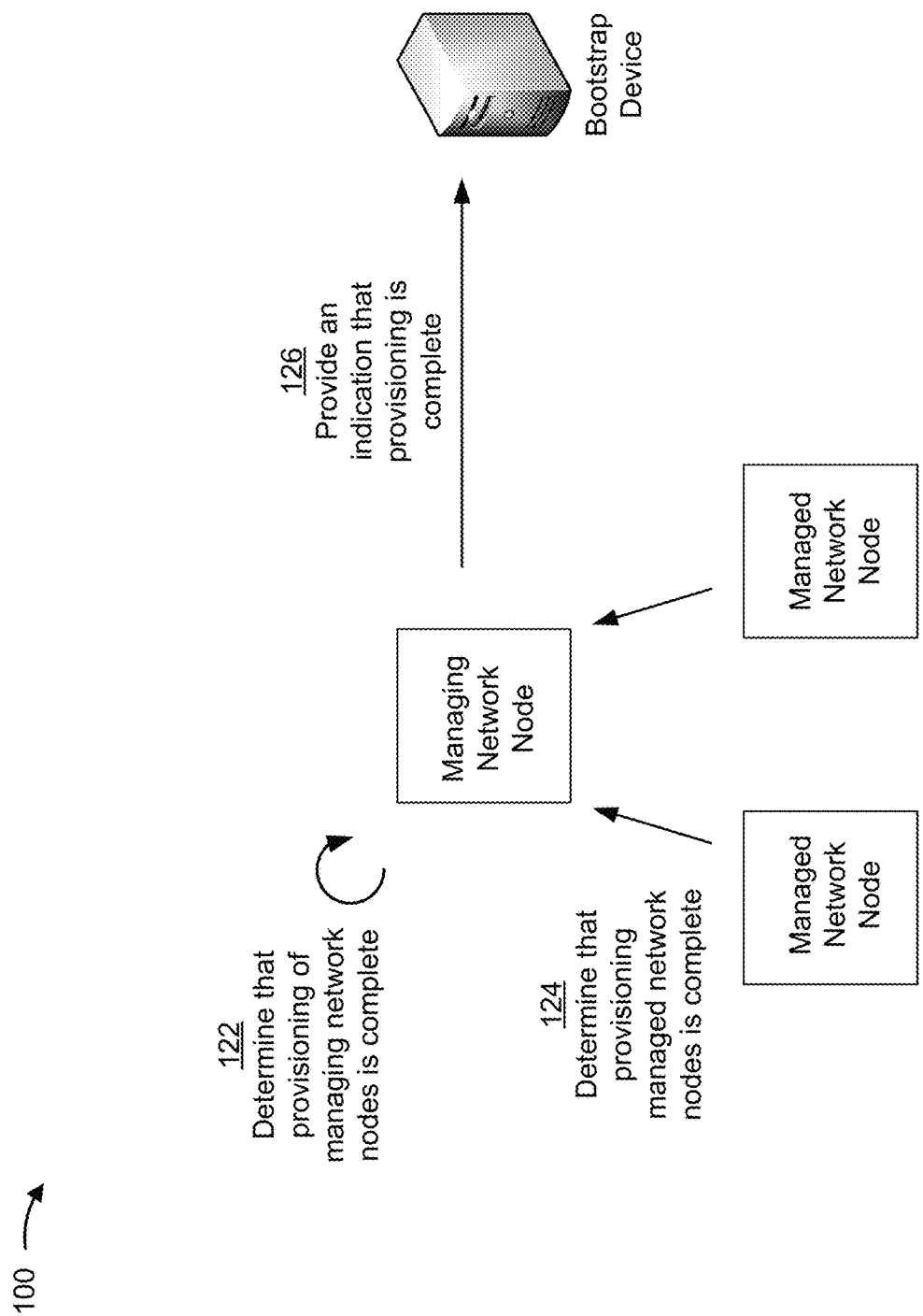

As shown in FIG. 1D, and by reference number 122, the managing network node may determine that provisioning has been completed for the managing network node. In some implementations, the managing network node determines that provisioning has been completed by determining that the plurality of steps for provisioning the managing network node have been completed.

As shown by reference number 124 the managing network node may determine that provisioning has been completed for the one or more managed network nodes. In some implementations, the managing network node determine that provisioning has been completed for the one or more managed network nodes according to completion of each of the one or more steps for provisioning.

In some implementations, the managing network node determines that provisioning has been completed for the one or more managed network nodes based on the managing network node determining that the managing network node has completed provisioning of the one or more managed network nodes. In some implementations, the managing network node determines that provisioning has been completed for the one or more managed network nodes by receiving, from the one or more managed network nodes, one or more indications of the completion. For example, if the managing network node provided the respective second provisioning information to the one or more managed network nodes, rather than performing the provisioning using the respective second provisioning information, the managing network node may be unaware of the completion until the managing network node receives an indication of the completion from the one or more managed network nodes.

As shown by reference number 126, the managing network node may provide, to the bootstrap device, a progress report that indicates that provisioning has been completed for the managing network node and the one or more managed network nodes (referred to herein as a "completion report"). In some implementations, the managing network node may provide a completion report, in a single message, that indicates that provisioning has been completed for the managing network node and the one or more managed network nodes. In some implementations, the managing network node may provide a plurality of completion reports indicating that provisioning has been completed with each completion report indicating that provisioning has been completed for only one of the network nodes.

A single message indicating that provisioning has been completed for the managing network node and the one or more managed network nodes may include respective fields for an identifier for the managing network node, a progress type of the message (e.g., that the message relates to a completion report), information related to the message content for the completion report on the managing network node (e.g., that the provisioning has been successfully completed, that there was an error in the provisioning process, and/or the like), information related to the one or more managed network nodes, and/or the like. The field for information related to the one or more managed network nodes may include a subfield for each of the one or more managed network nodes, each of which may include further subfields for an identifier for a respective managed network node, a progress type for the respective managed network node message (e.g., that the message relates to a completion report), information related to the message content for the completion report on the respective managed network node (e.g., that the provisioning has been successfully completed, that there was an error in the provisioning process, and/or the like), and/or the like.

In this way, the managing network node may provide progress reports, such as a progress report and/or a completion report, indicating progress and/or completion of provisioning for itself along with the one or more managed network nodes, which one or more managed network nodes might not otherwise be able to report on progress and/or completion of provisioning because of the configuration as managed network nodes. Additionally, the managing network node sending a progress report, such as the completion report, in a single message to the bootstrap device may conserve computing resources that may otherwise be used to send individual messages for each of the managing network node and the one or more managed network nodes. Further, the managing network node sending the progress report in a single message to the bootstrap device may conserve network resources of one or more communication networks that may otherwise be used to support transmissions of progress reports from each of the one or more managed network nodes.

Using some of the implementations described herein, the managing network node may perform or support SZTP of the one or more managed network nodes, to which SZTP might not otherwise be available. If SZTP were not available, computing resources would otherwise be used for manual provisioning and/or recovering from errors because of the manual provisioning. Additionally, some implementations described herein enable the managing network node to receive different provisioning information for some or all of the one or more managed network nodes by providing identifiers corresponding to each of the one or more managed network nodes, which identifiers may correlate to the different provisioning information.

Some implementations described herein may enable the managing network node to conserve network resources of one or more communication networks that may otherwise be used to support communications involved in a separate and individual provisioning process for each of the multiple network nodes. Additionally, some implementations may enable the managing network node to conserve communication resources that may otherwise be used by the managing network node and each of the one or more managed network nodes to transmit and receive the communications involved in the provisioning process. Further, some implementations described herein may enable the managing network node to expedite the provisioning process for the managing network node and the one or more managed network nodes, when compared to separately and individually performing the provisioning process for the managing network node and each of the one or more managed network nodes.

As indicated above, FIGS. 1A-1D are provided merely as one or more examples. Other examples may differ from what is described with regard to FIGS. 1A-1D.

Figure 2:
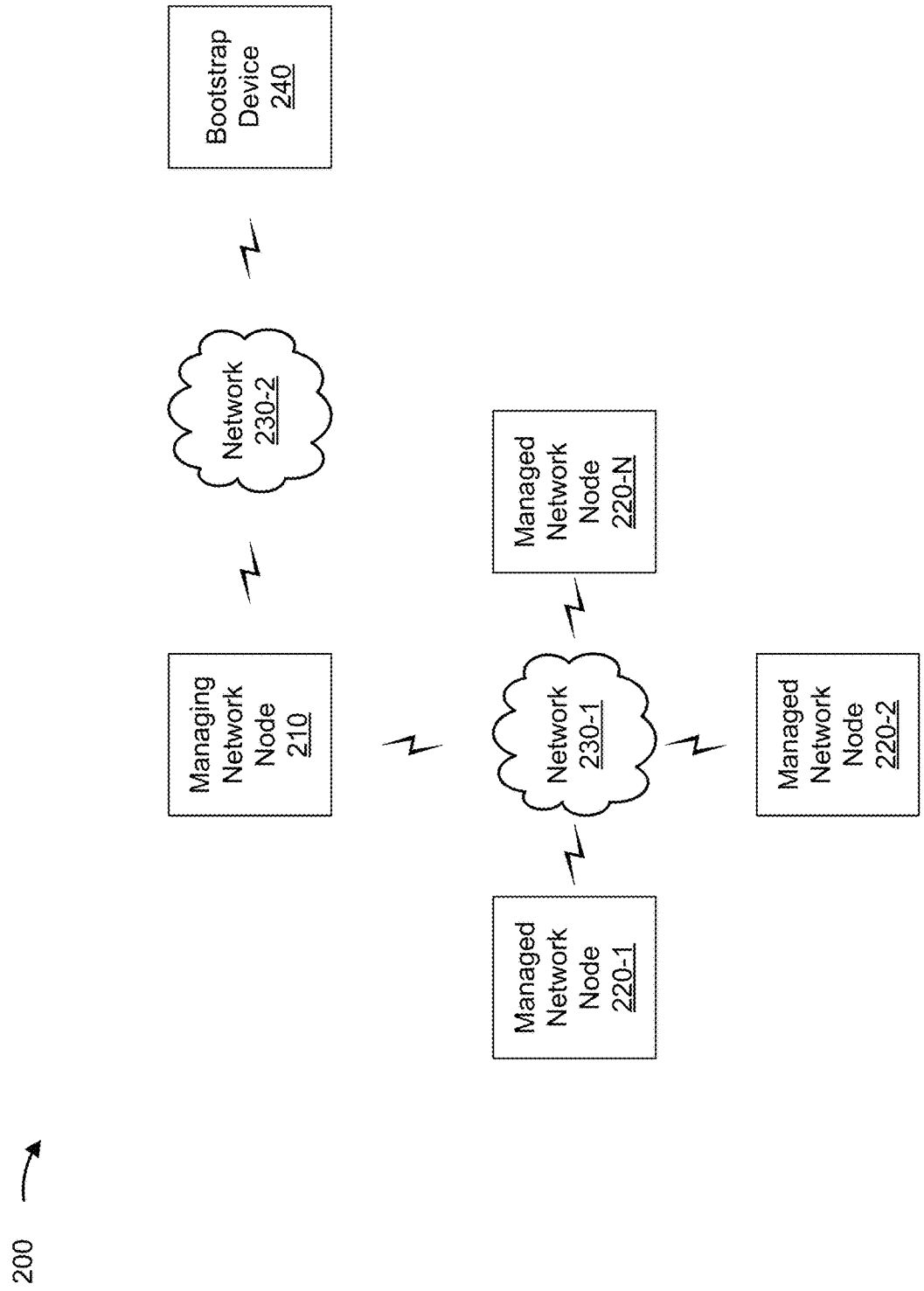
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a managing network node 210, one or more managed network nodes 220 (referred to herein individually as managed network node 220 or collectively as managed network nodes 220), one or more networks 230 (referred to herein individually as network 230 or collectively as networks 230-1 and 230-2), and a bootstrap device 240. Devices of environment 200 may interconnect via wired connections, wireless connections, or a combination of wired and wireless connections.

Managing network node 210 includes one or more devices capable of receiving, storing, generating, processing, forwarding, and/or transferring information, such as packets. For example, managing network node 210 may include a switch, a router, a security device, one or more devices implementing virtual machines, cloud computing resources, a gateway, a bridge, a network interface controller (NIC), and/or the like. In some implementations, managing network node 210 may be a physical device implemented within a housing, such as a chassis. In some implementations, managing network node 210 may be a virtual device implemented by one or more computer devices of a cloud computing environment or a data center. Managing network node 210 may request and receive, from bootstrap device 240, provisioning information for itself and/or managed network nodes 220. Managing network node 210 may provision itself and/or managed network nodes 220 and/or may provide one or more progress reports to bootstrap device 240.

Managed network nodes 220 include one or more devices capable of receiving, storing, generating, processing, forwarding, and/or transferring information, such as packets. For example, managed network nodes 220 may include one or more of a switch, a router, a security device, a device implementing virtual machines, a cloud computing resource, a gateway, a bridge, a network interface controller (NIC), and/or the like. In some implementations, managed network nodes 220 may be physical devices implemented within one or more housings, such as chasses. In some implementations, managed network nodes 220 may be virtual devices implemented by one or more computer devices of a cloud computing environment or a data center. Managed network nodes 220 may provide, to managing network node 210, one or more indications of progress of provisioning one or more of managed network nodes 220 and/or one or more indications that provisioning has been completed for respective managed network nodes 220.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Bootstrap device 240 includes one or more devices capable of storing, processing, and/or routing information associated with providing provisioning information to one or more network nodes. For example, bootstrap device 240 may include a server device, a collection of server devices, one or more computing resources of a cloud computing environment, a device within a data center, and/or the like. In some implementations, bootstrap device 240 may include a communication interface that allows bootstrap device 240 to receive information from, and/or transmit information to, other devices, such as those in environment 200, an orchestrator network management system, and/or the like. In some implementations, bootstrap device 240 may be associated with a customer portal, through which a deployment configuration for managing network node 210 and/or managed network nodes 220 are determined. Bootstrap device 240 may communicate with managing network node 210 to provide provisioning information for managing network node 210 and managed network nodes 220.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
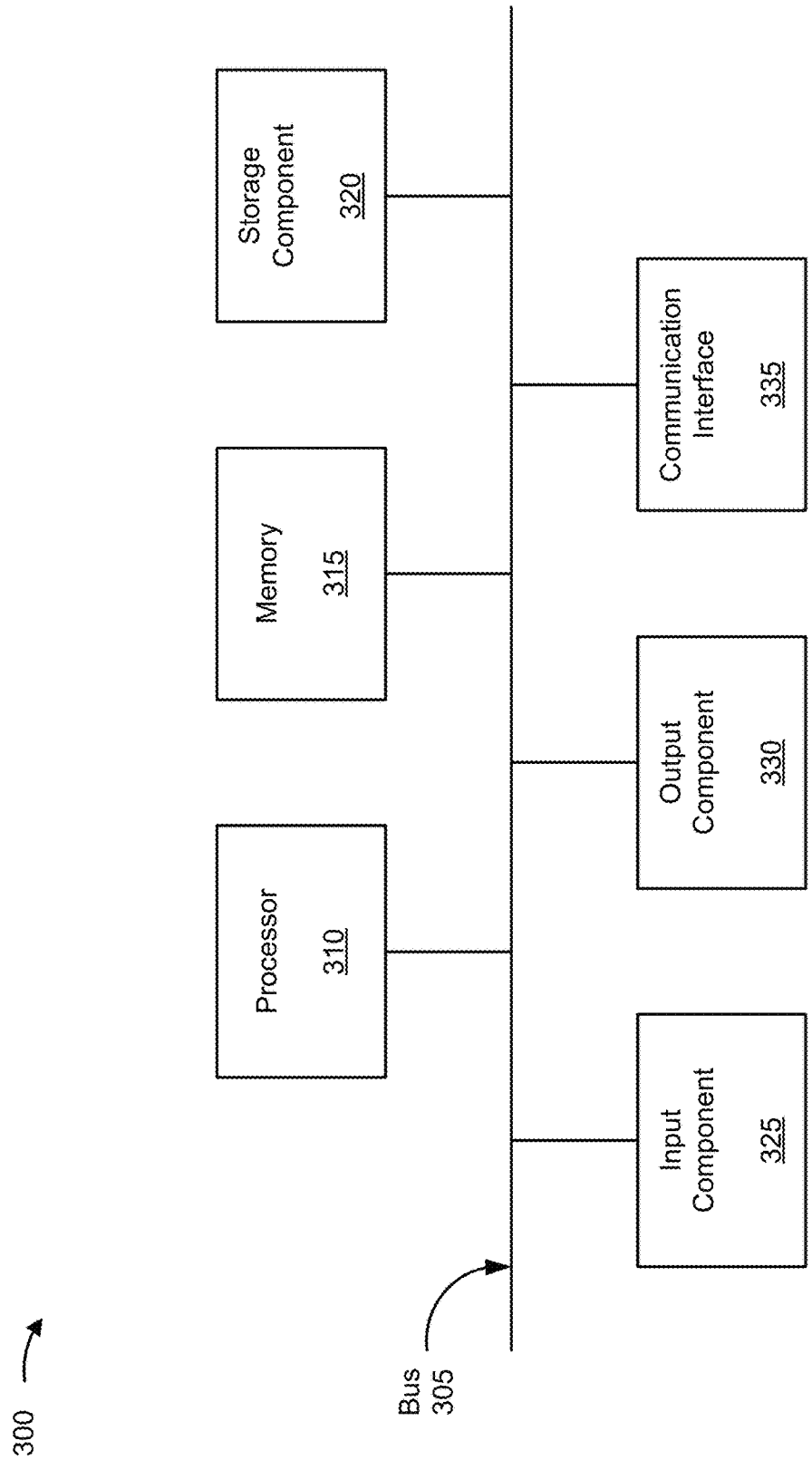
FIGS. 3A and 3B are diagrams of example components of one or more devices of FIG. 2.

FIG. 3A is a diagram of example components of a device 300. Device 300 may correspond to managing network node 210, managed network node 220, and/or bootstrap device 240. In some implementations, managing network node 210, managed network node 220, and/or bootstrap device 240 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
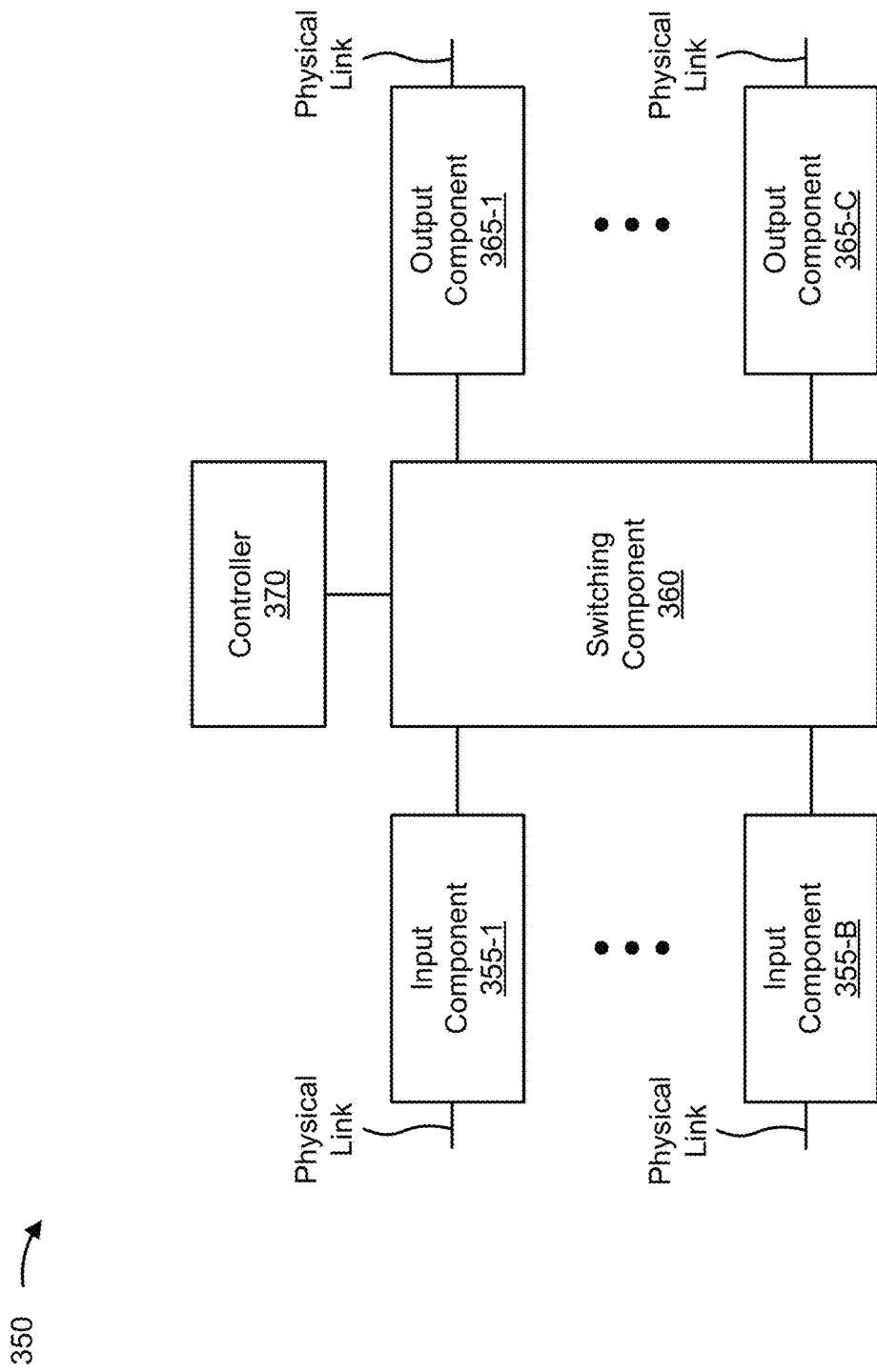

FIG. 3B is a diagram of example components of a device 350. Device 350 may correspond to one or more of managing network node 210 or managed network nodes 220. In some implementations, one or more of managing network node 210 or managed network nodes 220 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C(C≥1) (hereinafter referred to collectively as output components 365, and individually as output component 365), and a controller 370.

Input components 355 may be points of attachment for physical links and may be points of entry for incoming traffic, such as packets. Input components 355 may process incoming traffic, such as by performing data link layer encapsulation or decapsulation. In some implementations, input components 355 may send and/or receive packets. In some implementations, input components 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
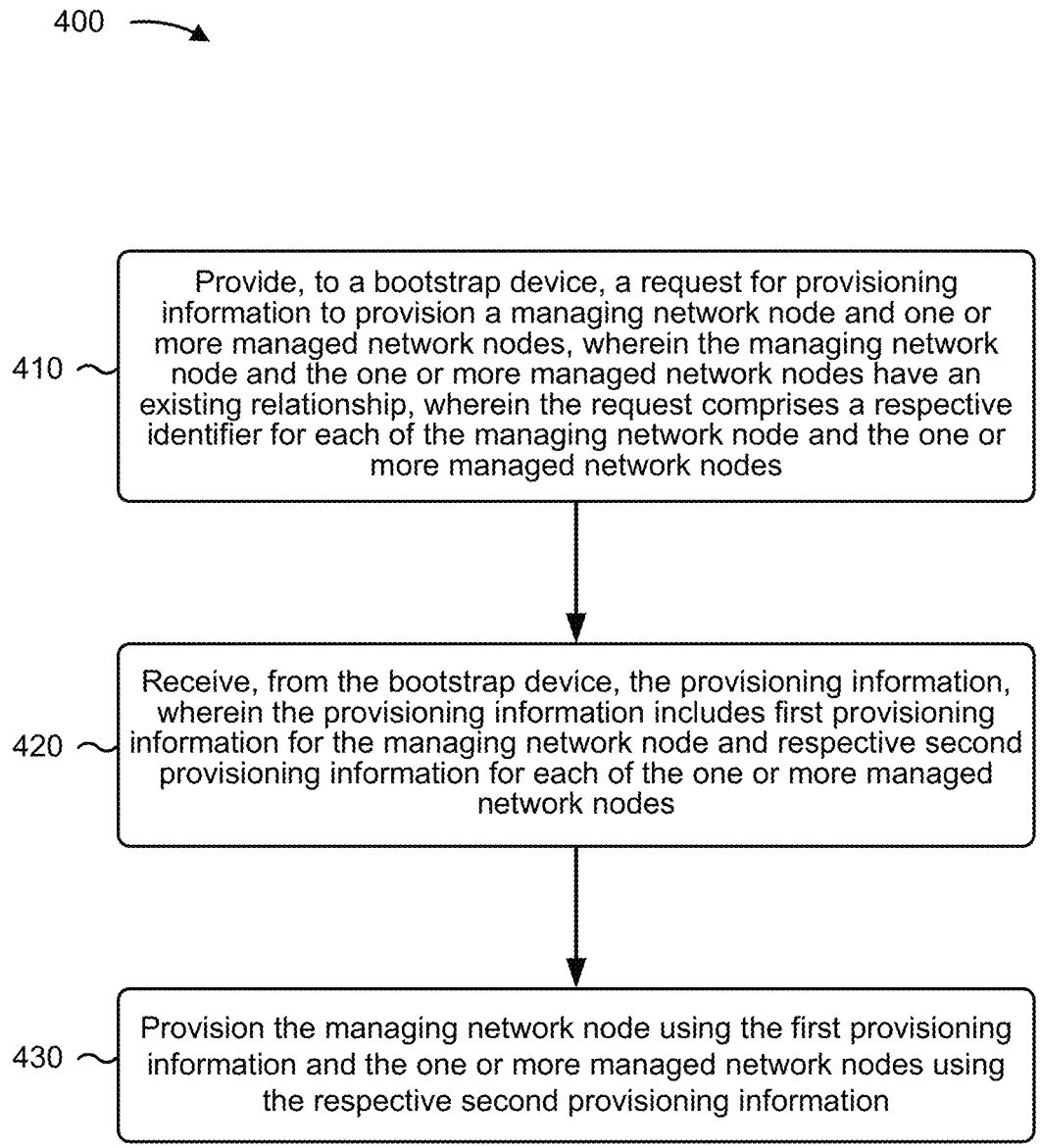
FIGS. 4-6 are flowcharts of example processes for provisioning managed network nodes and/or managing network nodes.

FIG. 4 is a flow chart of an example process 400 for provisioning managed network nodes and/or managing network nodes. In some implementations, one or more process blocks of FIG. 4 may be performed by a managing network node (e.g., managing network node 210). In some implementations, one or more process blocks of FIG. 4 may be performed by another device or a group of devices separate from or including the managing network node, such as a managed network node (e.g., managed network node 220), a bootstrap device (e.g., bootstrap device 240), and/or the like.

As shown in FIG. 4, process 400 may include providing, to a bootstrap device, a request for provisioning information to provision the managing network node and one or more managed network nodes, wherein the managing network node and the one or more managed network nodes have an existing relationship, and wherein the request comprises a respective identifier for each of the managing network node and the one or more managed network nodes (block 410). For example, the managing network node (e.g., using processor 310, memory 315, storage component 320, input component 325, output component 330, communication interface 335, controller 370, and/or the like) may provide, to a bootstrap device, a request for provisioning information to provision the managing network node and one or more managed network, as described above. In some implementations, the managing network node and the one or more managed network nodes have an existing relationship. In some implementations, the request comprises a respective identifier for each of the managing network node and the one or more managed network nodes.

As further shown in FIG. 4, process 400 may include receiving, from the bootstrap device, the provisioning information, wherein the provisioning information includes first provisioning information for the managing network node and respective second provisioning information for each of the one or more managed network nodes (block 420). For example, the managing network node (e.g., using processor 310, memory 315, storage component 320, input component 325, output component 330, communication interface 335, controller 370, and/or the like) may receive, from the bootstrap device, the provisioning information, as described above. In some implementations, the provisioning information includes first provisioning information for the managing network node and respective second provisioning information for each of the one or more managed network nodes.

As further shown in FIG. 4, process 400 may include provisioning the managing network node using the first provisioning information and the one or more managed network nodes using the respective second provisioning information (block 430). For example, the managing network node (e.g., using processor 310, memory 315, storage component 320, input component 325, output component 330, communication interface 335, controller 370, and/or the like) may provision the managing network node using the first provisioning information and the one or more managed network nodes using the respective second provisioning information, as described above.

Process 400 may include additional implementations, such as any single implementation or any combination of implementations described below and/or in connection with one or more other processes described elsewhere herein.

In a first implementation, process 400 further comprises: receiving, from a server, a network address of the bootstrap device; and establishing a connection with the bootstrap device using the network address of the bootstrap device.

In a second implementation, alone or in combination with the first implementation, process 400 further comprises providing, to the bootstrap device, one or more progress reports indicating progress of provisioning the managing network node or a managed network node of the one or more managed network nodes.

In a third implementation, alone or in combination with one or more of the first and second implementations, process 400 further comprises providing, to the bootstrap device, an indication that provisioning has been completed for the managing network node and the one or more managed network nodes.

In a fourth implementation, alone or in combination with one or more of the first through third implementations, the managing network node and the one or more managed network nodes are associated with a same chassis, a same virtual chassis, a same chassis cluster, or a multiple routing component system.

In a fifth implementation, alone or in combination with one or more of the first through fourth implementations, the respective identifier for each of the managing network node and the one or more managed network nodes enables the bootstrap device to identify the first provisioning information for the managing network node and the respective second provisioning information for each of the one or more managed network nodes.

In a sixth implementation, alone or in combination with one or more of the first through fifth implementations, the managing network node provides the request via a single message to the bootstrap device and the managing network node receives the provisioning information via a single message from the bootstrap device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
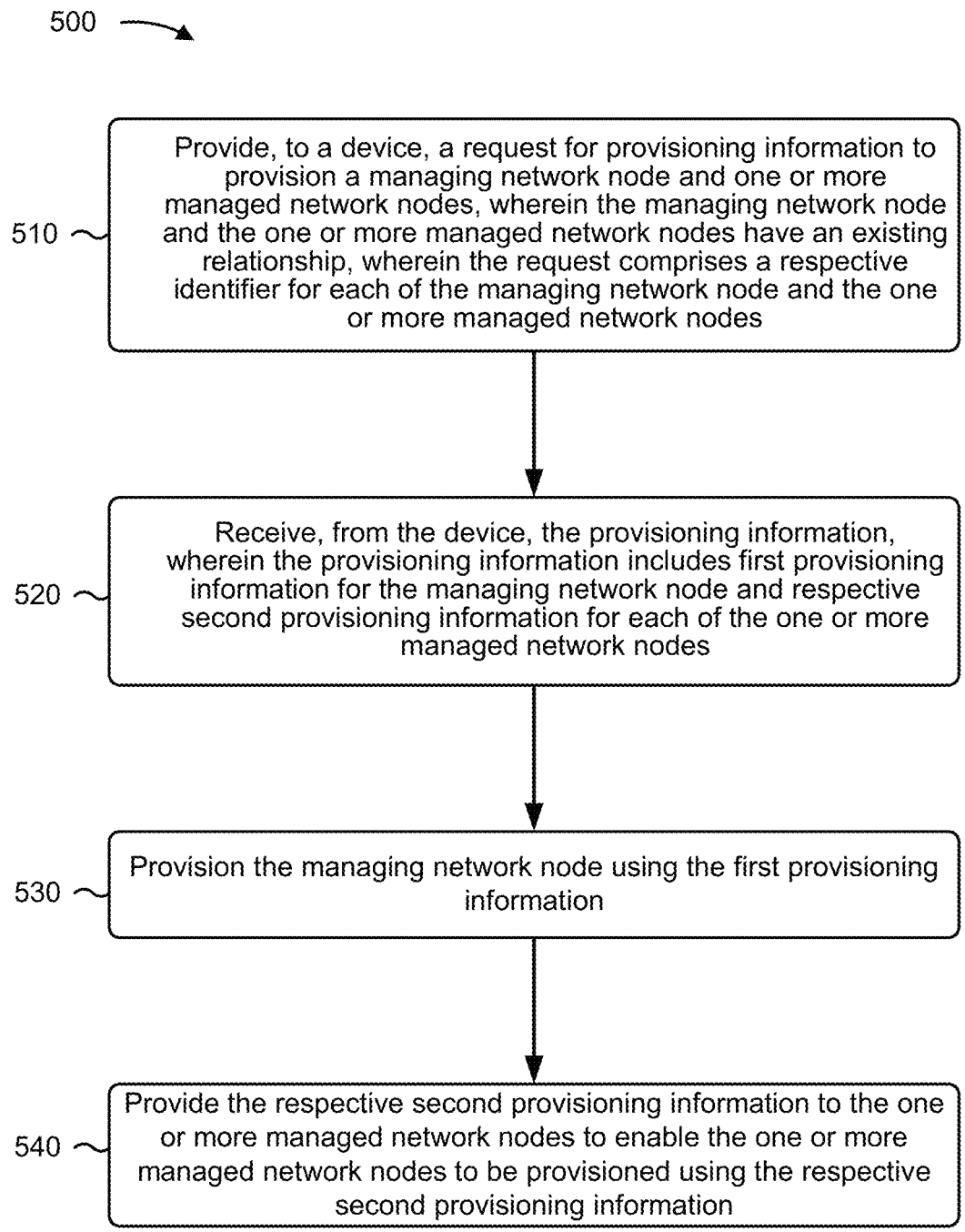

FIG. 5 is a flow chart of an example process 500 for provisioning managed network nodes and/or managing network nodes. In some implementations, one or more process blocks of FIG. 5 may be performed by a managing network node (e.g., managing network node 210). In some implementations, one or more process blocks of FIG. 5 may be performed by another device or a group of devices separate from or including the managing network node, such as a managed network node (e.g., managed network node 220), a bootstrap device (e.g., bootstrap device 240), and/or the like.

As shown in FIG. 5, process 500 may include providing, to a device, a request for provisioning information to provision the managing network node and one or more managed network nodes, wherein the managing network node and the one or more managed network nodes have an existing relationship, and wherein the request comprises a respective identifier for each of the managing network node and the one or more managed network nodes (block 510). For example, the managing network node (e.g., using processor 310, memory 315, storage component 320, input component 325, output component 330, communication interface 335, controller 370, and/or the like) may provide, to a device, a request for provisioning information to provision the managing network node and one or more managed network nodes, as described above. In some implementations, the managing network node and the one or more managed network nodes have an existing relationship. In some implementations, the request comprises a respective identifier for each of the managing network node and the one or more managed network nodes.

As further shown in FIG. 5, process 500 may include receiving, from the device, the provisioning information, wherein the provisioning information includes first provisioning information for the managing network node and respective second provisioning information for each of the one or more managed network nodes (block 520). For example, the managing network node (e.g., using processor 310, memory 315, storage component 320, input component 325, output component 330, communication interface 335, controller 370, and/or the like) may receive, from the device, the provisioning information, as described above. In some implementations, the provisioning information includes first provisioning information for the managing network node and respective second provisioning information for each of the one or more managed network nodes.

As further shown in FIG. 5, process 500 may include provisioning the managing network node using the first provisioning information (block 530). For example, the managing network node (e.g., using processor 310, memory 315, storage component 320, input component 325, output component 330, communication interface 335, controller 370, and/or the like) may provision the managing network node using the first provisioning information, as described above.

As further shown in FIG. 5, process 500 may include providing the respective second provisioning information to the one or more managed network nodes to enable the one or more managed network nodes to be provisioned using the respective second provisioning information (block 540). For example, the managing network node (e.g., using processor 310, memory 315, storage component 320, input component 325, output component 330, communication interface 335, controller 370, and/or the like) may provide the respective second provisioning information to the one or more managed network nodes to enable the one or more managed network nodes to be provisioned using the respective second provisioning information, as described above.

Process 500 may include additional implementations, such as any single implementation or any combination of implementations described below and/or in connection with one or more other processes described elsewhere herein.

In a first implementation, process 500 further comprises: receiving, from the one or more managed network nodes, one or more indications of progress of provisioning the one or more managed network nodes; and providing, to the device, one or more progress reports indicating progress of provisioning the managing network node or a managed network node of the one or more managed network nodes.

In a second implementation, alone or in combination with the first implementation, process 500 further comprises: receiving, from the one or more managed network nodes, one or more indications that provisioning has been completed for the one or more managed network nodes; and providing, to the device, an indication that provisioning has been completed for the managing network node and the one or more managed network nodes.

In a third implementation, alone or in combination with one or more of the first and second implementations, the request for the provisioning information comprises a single first message to the device, and the indication that provisioning has been completed for the managing network node and the one or more managed network nodes comprises a single second message to the device.

In a fourth implementation, alone or in combination with one or more of the first through third implementations, the managing network node and the one or more managed network nodes are associated with a same chassis, a same virtual chassis, a same chassis cluster, or a multiple routing component system.

In a fifth implementation, alone or in combination with one or more of the first through fourth implementations, the provisioning information comprises information to enable the managing network node and the one or more managed network nodes to establish one or more connections with one or more additional devices.

In a sixth implementation, alone or in combination with one or more of the first through fifth implementations, the provisioning information comprises one or more of: information to update a boot image for the managing network node and the one or more managed network nodes, or information for an initial configuration for the managing network node and the one or more managed network nodes.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
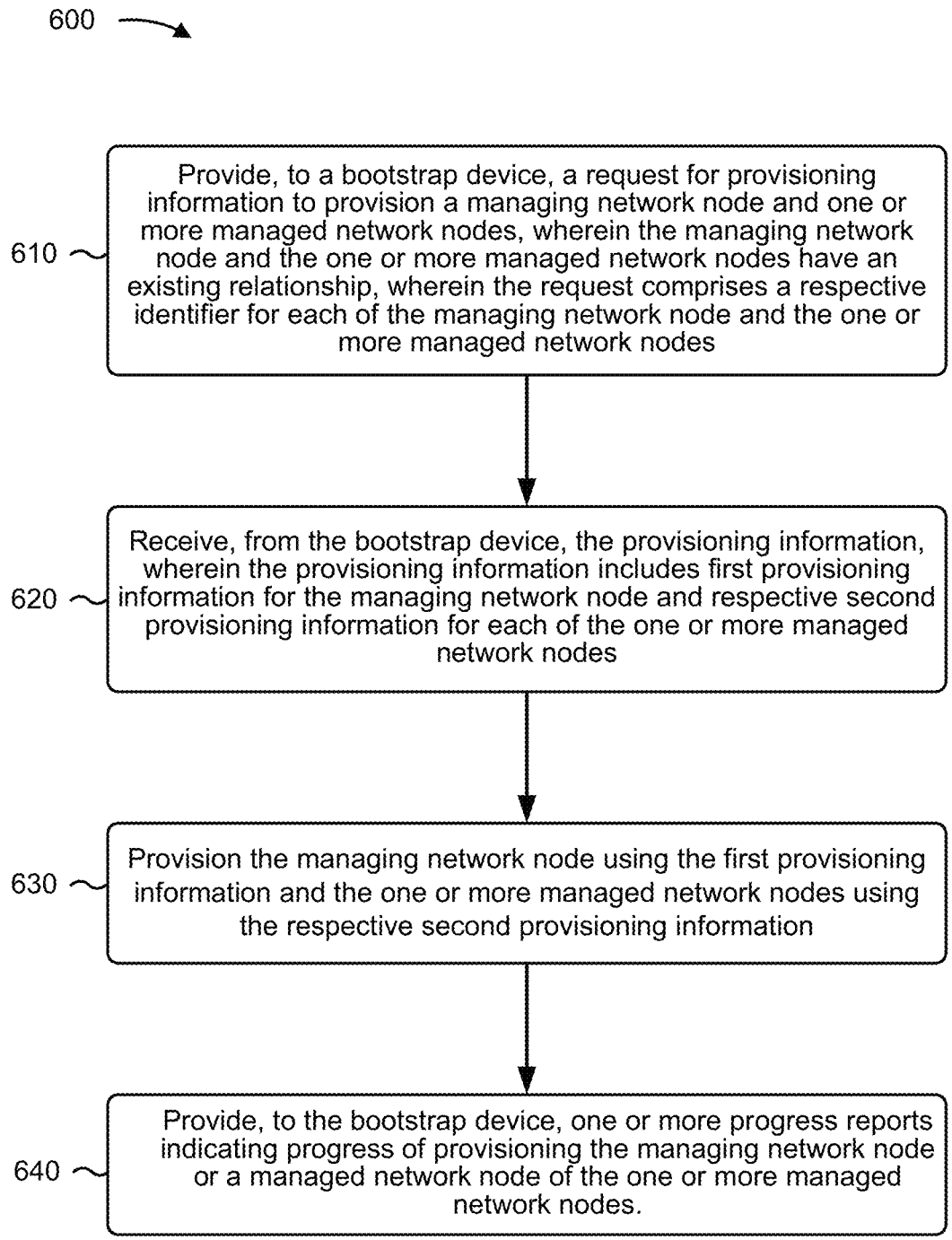

FIG. 6 is a flow chart of an example process 600 for provisioning managed network nodes and/or managing network nodes. In some implementations, one or more process blocks of FIG. 6 may be performed by a device (e.g., managing network node 210). In some implementations, one or more process blocks of FIG. 6 may be performed by another device or a group of devices separate from or including the device, such as a managed network node (e.g., managed network node 220), a bootstrap device (e.g., bootstrap device 240), and/or the like.

As shown in FIG. 6, process 600 may include providing, to a bootstrap device, a request for provisioning information to provision a managing network node and one or more managed network nodes, wherein the managing network node and the one or more managed network nodes have an existing relationship, and wherein the request comprises a respective identifier for each of the managing network node and the one or more managed network nodes (block 610). For example, the device (e.g., using processor 310, memory 315, storage component 320, input component 325, output component 330, communication interface 335, controller 370, and/or the like) may provide, to a bootstrap device, a request for provisioning information to provision a managing network node and one or more managed network nodes, as described above. In some implementations, the managing network node and the one or more managed network nodes have an existing relationship. In some implementations, the request comprises a respective identifier for each of the managing network node and the one or more managed network nodes.

As further shown in FIG. 6, process 600 may include receiving, from the bootstrap device, the provisioning information, wherein the provisioning information includes first provisioning information for the managing network node and respective second provisioning information for each of the one or more managed network nodes (block 620). For example, the device (e.g., using processor 310, memory 315, storage component 320, input component 325, output component 330, communication interface 335, controller 370, and/or the like) may receive, from the bootstrap device, the provisioning information, as described above. In some implementations, the provisioning information includes first provisioning information for the managing network node and respective second provisioning information for each of the one or more managed network nodes.

As further shown in FIG. 6, process 600 may include provisioning the managing network node using the first provisioning information and the one or more managed network nodes using the respective second provisioning information (block 630). For example, the device (e.g., using processor 310, memory 315, storage component 320, input component 325, output component 330, communication interface 335, controller 370, and/or the like) may provision the managing network node using the first provisioning information and the one or more managed network nodes using the respective second provisioning information, as described above.

As further shown in FIG. 6, process 600 may include providing, to the bootstrap device, one or more progress reports indicating progress of provisioning the managing network node or a managed network node of the one or more managed network nodes (block 640). For example, the device (e.g., using processor 310, memory 315, storage component 320, input component 325, output component 330, communication interface 335, controller 370, and/or the like) may provide, to the bootstrap device, one or more progress reports indicating progress of provisioning the managing network node or a managed network node of the one or more managed network nodes, as described above.

Process 600 may include additional implementations, such as any single implementation or any combination of implementations described below and/or in connection with one or more other processes described elsewhere herein.

In a first implementation, process 600 further comprises providing, to the bootstrap device, an indication that provisioning has been completed for the managing network node and the one or more managed network nodes.

In a second implementation, alone or in combination with the first implementation, the request for the provisioning information comprises a single message to the bootstrap device, and the single message comprises a respective unique identifier for each of the managing network node and the one or more managed network nodes.

In a third implementation, alone or in combination with one or more of the first and second implementations, the provisioning information comprises information to update a boot image for the managing network node and the one or more managed network nodes.

In a fourth implementation, alone or in combination with one or more of the first through third implementations, the managing network node and the one or more managed network nodes are associated with a same chassis, a same virtual chassis, a same chassis cluster, or a multiple routing component system.

In a fifth implementation, alone or in combination with one or more of the first through fourth implementations, the provisioning information comprises information for an initial configuration for the managing network node and the one or more managed network nodes.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a managing network node, comprising:
    providing, by the managing network node and to a bootstrap device, a request for provisioning information to provision the managing network node and one or more managed network nodes,
        wherein the managing network node and the one or more managed network nodes are in a factory default state,
        wherein the managing network node and the one or more managed network nodes have an existing relationship in which the managing network node is configured to provide instructions to the one or more managed network nodes, and
        wherein the request comprises a respective identifier for each of the managing network node and the one or more managed network nodes;
    receiving, responsive to the request, by the managing network node and from the bootstrap device, the provisioning information,
        wherein the provisioning information includes first provisioning information for the managing network node and separate respective second provisioning information for each of the one or more managed network nodes; and
    provisioning, by the managing network node, the managing network node using the first provisioning information and the one or more managed network nodes using the separate respective second provisioning information,
        wherein communications from the one or more managed network nodes to the bootstrap device are through the managing network node.

2. The method of claim 1, further comprising:
    receiving, from a server, a network address of the bootstrap device; and
    establishing a connection with the bootstrap device using the network address of the bootstrap device.

3. The method of claim 1, further comprising:
    providing, to the bootstrap device, one or more progress reports indicating one or more of:
        progress of provisioning the managing network node, or
        progress of provisioning a managed network node of the one or more managed network nodes.

4. The method of claim 1, further comprising providing, to the bootstrap device, an indication that provisioning has been completed for the managing network node and the one or more managed network nodes.

5. The method of claim 1, wherein the managing network node and the one or more managed network nodes function as a same virtual chassis.

6. The method of claim 1, wherein the respective identifier for each of the managing network node and the one or more managed network nodes enables the bootstrap device to identify the first provisioning information for the managing network node and the separate respective second provisioning information for each of the one or more managed network nodes.

7. The method of claim 1, wherein the managing network node provides the request via a single message to the bootstrap device and wherein the managing network node receives the provisioning information via a single message from the bootstrap device.

8. A managing network node, comprising:
one or more memories; and
one or more processors configured to:
provide, to a device, a request for provisioning information to provision the managing network node and one or more managed network nodes,
wherein the managing network node and the one or more managed network nodes are in a factory default state,
wherein the managing network node and the one or more managed network nodes have an existing relationship in which the managing network node is configured to provide instructions to the one or more managed network nodes, and
wherein the request comprises a respective identifier for each of the managing network node and the one or more managed network nodes;
receive, responsive to the request and from the device, the provisioning information,
wherein the provisioning information includes first provisioning information for the managing network node and separate respective second provisioning information for each of the one or more managed network nodes, and
wherein the managing network node and the one or more managed network nodes are enabled to perform Secure Zero Touch Provisioning (SZTP);
provision the managing network node using the first provisioning information,
wherein communications from the one or more managed network nodes to the device are through the managing network node; and
provide the respective second provisioning information to the one or more managed network nodes to enable the one or more managed network nodes to be provisioned using the separate respective second provisioning information.

9. The managing network node of claim 8, wherein the one or more processors are further configured to:
provide, to the device, one or more progress reports indicating progress of provisioning the managing network node and a managed network node of the one or more managed network nodes.

10. The managing network node of claim 8, wherein the one or more processors are further configured to:
receive, from the one or more managed network nodes, one or more indications that provisioning has been completed for the one or more managed network nodes; and
provide, to the device, an indication that provisioning has been completed for the managing network node and the one or more managed network nodes.

11. The managing network node of claim 10, wherein the request for the provisioning information comprises a single first message to the device, and
wherein the indication that provisioning has been completed for the managing network node and the one or more managed network nodes comprises a single second message to the device.

12. The managing network node of claim 8, wherein the managing network node and the one or more managed network nodes are associated with a same chassis, a same virtual chassis, or a same chassis cluster.

13. The managing network node of claim 8, wherein the provisioning information comprises information to enable the managing network node and the one or more managed network nodes to establish one or more connections with one or more additional devices.

14. The managing network node of claim 8, wherein the provisioning information comprises one or more of:
information to update a boot image for the managing network node and the one or more managed network nodes, or
information for an initial configuration for the managing network node and the one or more managed network nodes.

15. A non-transitory computer-readable medium storing instructions, the instructions comprising:
one or more instructions that, when executed by one or more processors of a managing networking node, cause the one or more processors to:
provide, to a bootstrap device, a request for provisioning information to provision the managing network node and one or more managed network nodes,
wherein the managing network node and the one or more managed network nodes are in a factory default state, wherein the managing network node and the one or more managed network nodes have an existing relationship in which the managing network node is configured to provide instructions to the one or more managed network nodes, and
wherein the request comprises a respective identifier for each of the managing network node and the one or more managed network nodes;
receive, responsive to the request and from the bootstrap device, the provisioning information,
wherein the provisioning information for the managing network node and the one or more managed network nodes is similar, and
wherein the provisioning information includes first provisioning information for the managing network node and separate respective second provisioning information for each of the one or more managed network nodes; and
provision the managing network node using the first provisioning information and the one or more managed network nodes using the separate respective second provisioning information,
wherein communications from the one or more managed network nodes to the bootstrap device are through the managing network node; and
provide, to the bootstrap device, one or more progress reports indicating progress of provisioning a managed network node of the one or more managed network nodes.

16. The non-transitory computer-readable medium of claim 15, wherein the one or more instructions, when executed by the one or more processors, further cause the one or more processors to provide, to the bootstrap device, an indication that provisioning has been completed for the managing network node and the one or more managed network nodes.

17. The non-transitory computer-readable medium of claim 16, wherein the request for the provisioning information comprises a single message to the bootstrap device, and
wherein the single message comprises a respective unique identifier for each of the managing network node and the one or more managed network nodes.

18. The non-transitory computer-readable medium of claim 15, wherein the provisioning information comprises information to update a boot image for the managing network node and the one or more managed network nodes.

19. The non-transitory computer-readable medium of claim 15, wherein the managing network node and the one or more managed network nodes function as a same chassis cluster.

20. The non-transitory computer-readable medium of claim 15, wherein the provisioning information comprises information for an initial configuration for the managing network node and the one or more managed network nodes.

* * * * *